(12) United States Patent
Terahara et al.

(10) Patent No.: US 10,473,882 B2
(45) Date of Patent: *Nov. 12, 2019

(54) LEAD SCREW DEVICE, LENS DRIVER, LENS BARREL, AND CAMERA USING THE LEAD SCREW DEVICE

(71) Applicant: RICOH IMAGING COMPANY, LTD., Tokyo (JP)

(72) Inventors: Daisuke Terahara, Kanagawa (JP); Takehide Ohno, Kanagawa (JP); Terunori Koyama, Kanagawa (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,420

(22) Filed: Aug. 7, 2017

(65) Prior Publication Data

US 2017/0336592 A1 Nov. 23, 2017

Related U.S. Application Data

(63) Continuation of application No. 14/280,977, filed on May 19, 2014, now Pat. No. 9,726,849.

(30) Foreign Application Priority Data

May 23, 2013 (JP) .................................. 2013-108483

(51) Int. Cl.
G02B 7/04 (2006.01)
G02B 7/10 (2006.01)

(52) U.S. Cl.
CPC . *G02B 7/04* (2013.01); *G02B 7/10* (2013.01)

(58) Field of Classification Search
CPC .......... G02B 7/02; G02B 7/021; G02B 7/022; G02B 7/023; G02B 7/026; G02B 7/04;
(Continued)

(56) References Cited

U.S. PATENT DOCUMENTS 5,391,866 A 2/1995 Hoshino
5,748,394 A 5/1998 Shimazaki
(Continued)

FOREIGN PATENT DOCUMENTS

EP 1791350 5/2007
JP 06-174992 A 6/1994
(Continued)

OTHER PUBLICATIONS

Search report from E.P.O., dated Oct. 14, 2014.
(Continued)

*Primary Examiner* — Nicholas R. Pasko
(74) *Attorney, Agent, or Firm* — Greenblum & Bernstein, P.L.C.

(57) ABSTRACT

An optical device includes an optical system including a plurality of lens groups, at least one lens group being a movable lens group moving in an optical axis direction, and a movable frame to move the movable lens group. The movable frame includes a driving source, a drive screw, a lens supporting frame, and maintaining an integrated state relative to the movable lens group, a plurality of arms disposed in a position to face the drive screw and being openable and closable relative to the drive screw with a single opening and closing axis as a support axis, the plurality of arms including a first arm and a second arm, and a biasing spring configured to apply a biasing force to the first arm in a direction in which the first arm approaches the drive screw, wherein the lens supporting frame is further configured to support the biasing spring.

19 Claims, 9 Drawing Sheets

(58) Field of Classification Search
CPC ... G02B 7/08; G02B 7/09; G02B 7/10; G02B 7/102; G02B 7/105
USPC .................................................. 359/819–830
See application file for complete search history.

(56) References Cited

U.S. PATENT DOCUMENTS

| | | | |
|---|---|---|---|
| 6,654,557 B2 * | 11/2003 | Kikuchi | G02B 7/04 |
| | | | 359/823 |
| 7,339,756 B2 * | 3/2008 | Tengeiji | G02B 7/021 |
| | | | 359/694 |
| 7,474,845 B2 | 1/2009 | Hayashi | |
| 7,757,575 B2 | 7/2010 | Sato | |
| 7,800,850 B2 * | 9/2010 | Hasegawa | G02B 7/102 |
| | | | 359/811 |
| 7,936,525 B2 | 5/2011 | Wakamizu et al. | |
| 7,940,480 B2 | 5/2011 | Huang | |
| 8,009,974 B2 | 8/2011 | Kouno | |
| 8,503,118 B2 | 8/2013 | Wakayama | |
| 9,726,849 B2 * | 8/2017 | Terahara | G02B 7/04 |
| 2006/0269267 A1 | 11/2006 | Hayashi et al. | |
| 2009/0087172 A1 | 4/2009 | Nakazawa et al. | |
| 2012/0314311 A1 | 12/2012 | Tsuzuki | |
| 2014/0293462 A1 * | 10/2014 | Sato | G02B 7/023 |
| | | | 359/822 |

FOREIGN PATENT DOCUMENTS

| | | |
|---|---|---|
| JP | 6-222254 A | 8/1994 |
| JP | 07-43580 A | 2/1995 |
| JP | 11-295578 A | 10/1999 |
| JP | 2005-315935 A | 11/2005 |
| JP | 3766379 B2 | 2/2006 |
| JP | 2006-330543 A | 12/2006 |
| JP | 2007-102062 | 4/2007 |
| JP | 2009-042306 A | 2/2009 |
| JP | 2009-075254 A | 4/2009 |
| JP | 2009-080248 | 4/2009 |
| JP | 2010-276635 A | 12/2010 |
| JP | 2011-232406 A | 11/2011 |
| JP | 4973227 B2 | 4/2012 |
| JP | 4973227 B2 | 7/2012 |
| JP | 2012-252288 A | 12/2012 |
| JP | 2014-194486 A | 10/2014 |

OTHER PUBLICATIONS

Office Action issued in Japanese family member Patent Appl. No. 2013-108483, dated Dec. 27, 2016, along with an English translation thereof.

Office Action issued in Japanese family member Patent Appl. No. 2013-108483, dated Aug. 16, 2017, along with an English translation thereof.

* cited by examiner

LEAD SCREW DEVICE, LENS DRIVER, LENS BARREL, AND CAMERA USING THE LEAD SCREW DEVICE

CROSS REFERENCE TO RELATED APPLICATIONS

This is a continuation application of U.S. patent application Ser. No. 14/280,977, filed May 19, 2014, which claims priority from Japanese Patent Application No. 2013-108483, filed on May 23, 2013, the disclosure of which is hereby incorporated by reference in its entirety.

BACKGROUND

Field of the Invention

The present invention relates to a lead screw device, a lens driver, a lens barrel, and a camera using the lead screw device.

Description of the Related Art

A lead screw device is used as a lens driver which drives a lens of a camera in an optical axis direction. The lead screw device includes a lead screw which rotates about an axis and a nut member which is threadably mounted on the lead screw, and moves in a straight line along with the rotation of the lead screw about an axis. The lead screw device is configured to hold a lens in a lens holder connected to the nut member. A focus adjuster described in JP3766379B, for example, uses such a lead screw device.

In this lead screw device, it is necessary to threadably mount the nut member on the lead screw from one end portion of the lead screw in the case of mounting the nut member on the lead screw. However, in the lead screw device described in JP3766379B, both ends of the lead screw in the axis direction are supported by a U-shaped supporting member. The nut member cannot be therefore assembled to the lead screw. For this reason, it is necessary to assemble the lead screw after assembling the nut member to the lead screw in advance or to provide a special supporting structure of the lead screw such that the nut member can be assembled after assembling the lead screw. Such requirements for the assembling order or the special structure trigger an increase in the manufacturing cost of a lens driver.

As a method of solving the above problem, it is considered to use a half nut described in JP2009-80248A as the nut member. This half nut is a nut member in which a circular nut member is cut in a radial direction. The half nut can be laterally threadably mounted on the lead screw, namely, the lead screw can be threadably mounted on the lead screw from the radial direction even in a state in which the lead screw is assembled. Therefore, the above-described requirements for the assembling order and the special structure are unnecessary, and an increase in the manufacturing cost of the lens driver can be avoided.

With the configuration using the half nut as described in JP2009-80248A, the half nut is threadably mounted on the lead screw only from one side of the lead screw in the radial direction of the lead screw. Thus, the strength of the half nut when threadably mounted on the lead screw is reduced. For this reason, tooth skipping of the half nut easily occurs when an external force in the axis direction of the lead screw is applied to the half nut. More specifically, the half nut moves over the thread of the lead screw by the external force, so that the half nut moves in the axis direction of the lead screw. In order to prevent the tooth skipping, if the half nut is pressed to the lead screw in a radial direction so as to have strong contact with the lead screw, the stress due to the external force applied to the half nut is concentrated in the position where the half nut is threadably mounted on the lead screw, namely, the thread portions of both of the half nut and the lead screw. For this reason, the thread portions may be damaged due to the stress. In a lens driver, which drives the lens group on a subject side among a plurality of lens groups disposed in a lens barrel, a photographer may touch the lens group, and the external force may be applied to the lens group. Therefore, it is required to control or prevent the tooth skipping or damage on the thread portion due to such an external force.

SUMMARY

It is, therefore, an object of the present invention to provide a lead screw device which can control tooth skipping and prevent damage on a thread portion. Another object of the present invention is to provide a lens driver, lens barrel, and camera including the lead screw device which prevents the tooth skipping and damage on the thread portion.

To attain the above object, one embodiment of the present invention provides a lead screw device, including: a lead screw including a thread portion; and a driven body which engages with the thread portion, and moves in an axis direction of the lead screw along with rotation of the lead screw about an axis, the driven body including a pair of driven members disposed to sandwich the lead screw in a radial direction, wherein the pair of driven members is biased in a direction which sandwiches the lead screw in the radial direction, and a tooth portion provided in each of the driven members engages with the thread portion of the lead screw by a biasing force.

One embodiment of the present invention also provides a lead screw device, including: a lead screw; and a driven body which engages with the lead screw and moves in an axis direction of the lead screw along with rotation of the lead screw about an axis, the driven body including a pair of driven members disposed to sandwich the lead screw in parallel with an axis center of the lead screw, wherein the pair of driven members is biased in a direction coming close to the axis center, and moves in a direction away from the axis center against the biasing force.

BRIEF DESCRIPTION OF THE DRAWINGS

The accompanying drawings are included to provide further understanding of the invention, and are incorporated in and constitute a part of this specification. The drawings illustrate an embodiment of the invention and, together with the specification, serve to explain the principle of the invention.

DETAILED DESCRIPTION OF THE PREFERRED EMBODIMENTS

Figure 1:
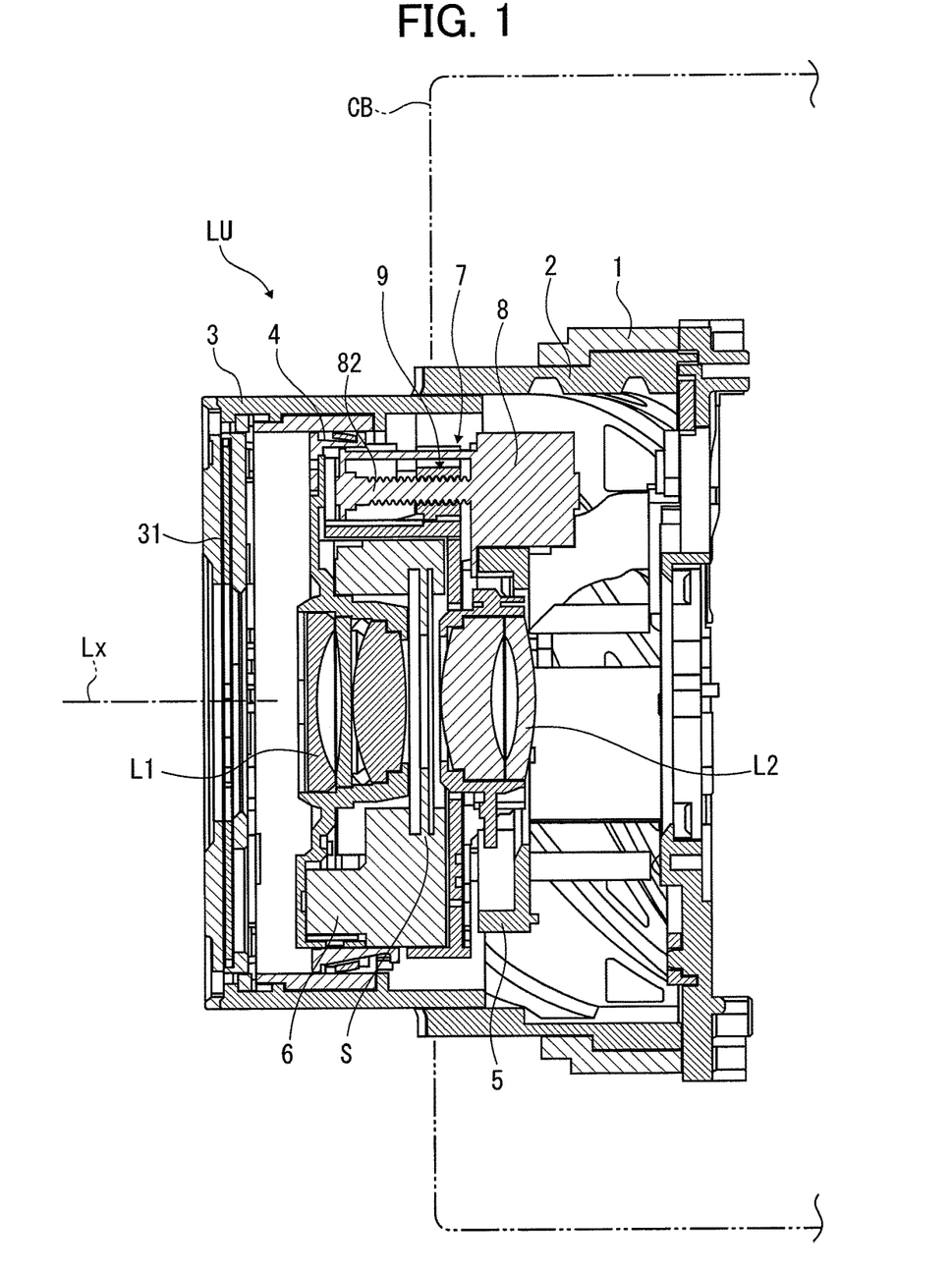
FIG. 1 is a sectional view illustrating an entire configuration of a lens barrel according to an embodiment of the present invention.

Next, an embodiment of the present invention will be described with reference to the drawings. This embodiment is an example in which the present invention is applied to a lens driver provided in a lens barrel of a camera. FIG. 1 illustrates an embodiment in which a lens barrel of a camera according to the present invention is integrally incorporated into a camera body CB as a lens unit LU. FIG. 1 is a sectional view illustrating a camera in shooting which is cut along the optical axis of a lens. Referring to FIG. 1, sections associated with the present invention will be described. In the lens unit LU, a rotation barrel 2 is held in the inner circumferential surface of a fixed barrel 1 fixed in the camera body CB illustrated by the dashed line in FIG. 1. A straight movement barrel 3 and a lens cylinder 4 are held inside the rotation barrel 2. The straight movement barrel 3 and the lens cylinder 4 are helicoid-coupled to the rotation barrel 2. The rotation barrel 2 rotates about a lens optical axis Lx in shooting by a driving force of an extending motor which is not illustrated in FIG. 1. The straight movement barrel 3 and the lens cylinder 4 straightly move forward (toward a subject, hereinafter, the subject side is referred to as a front and the opposite side is referred to as a back in the front and back direction) by the rotation of the rotation barrel 2, so as to extend from the housed position in the camera body CB. The straight movement barrel 3 and the lens cylinder 4 are separately helicoid-coupled to the rotation barrel 2, so that the extending amount of each barrel and cylinder differs. A lens barrier 31, which protects the inside of the lens unit LU by opening an opening provided in the front surface of the straight movement barrel 3 in shooting and closing the opening in non-shooting, is provided in the front end portion of the straight movement barrel 3.

The lens cylinder 4 includes a motor frame 5 disposed in the back side of the lens optical axis direction and a lens-holding frame 6 which is disposed in front of the motor frame 5. A lens driver 7 of the present invention moves the lens-holding frame 6 relative to the motor frame 5 in the lens optical axis direction for focusing. When the straight movement barrel 3 is extended by the rotation of the rotation barrel 2, the motor frame 5 is also extended to a predetermined position. The lens-holding frame 6 includes a first group lens L1, shutter S, and second group lens L2, and is supported to be movable relative to the motor frame 5 in the lens optical axis direction, and the relative movement of the lens-holding frame 6 in the lens optical axis direction is controlled by the lens driver 7.

Figure 2:
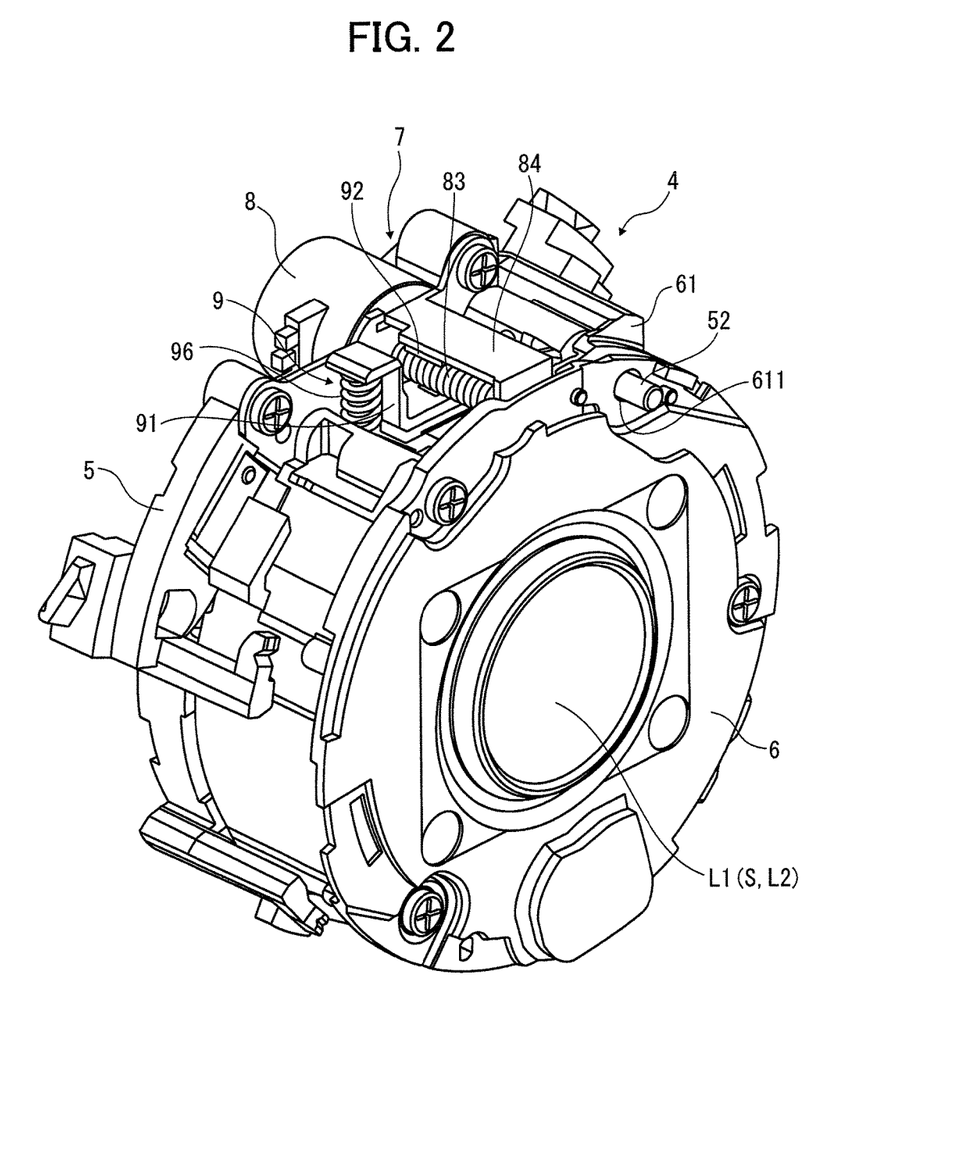
FIG. 2 is an external perspective view illustrating a lens cylinder according to the embodiment of the present invention.
Figure 3:
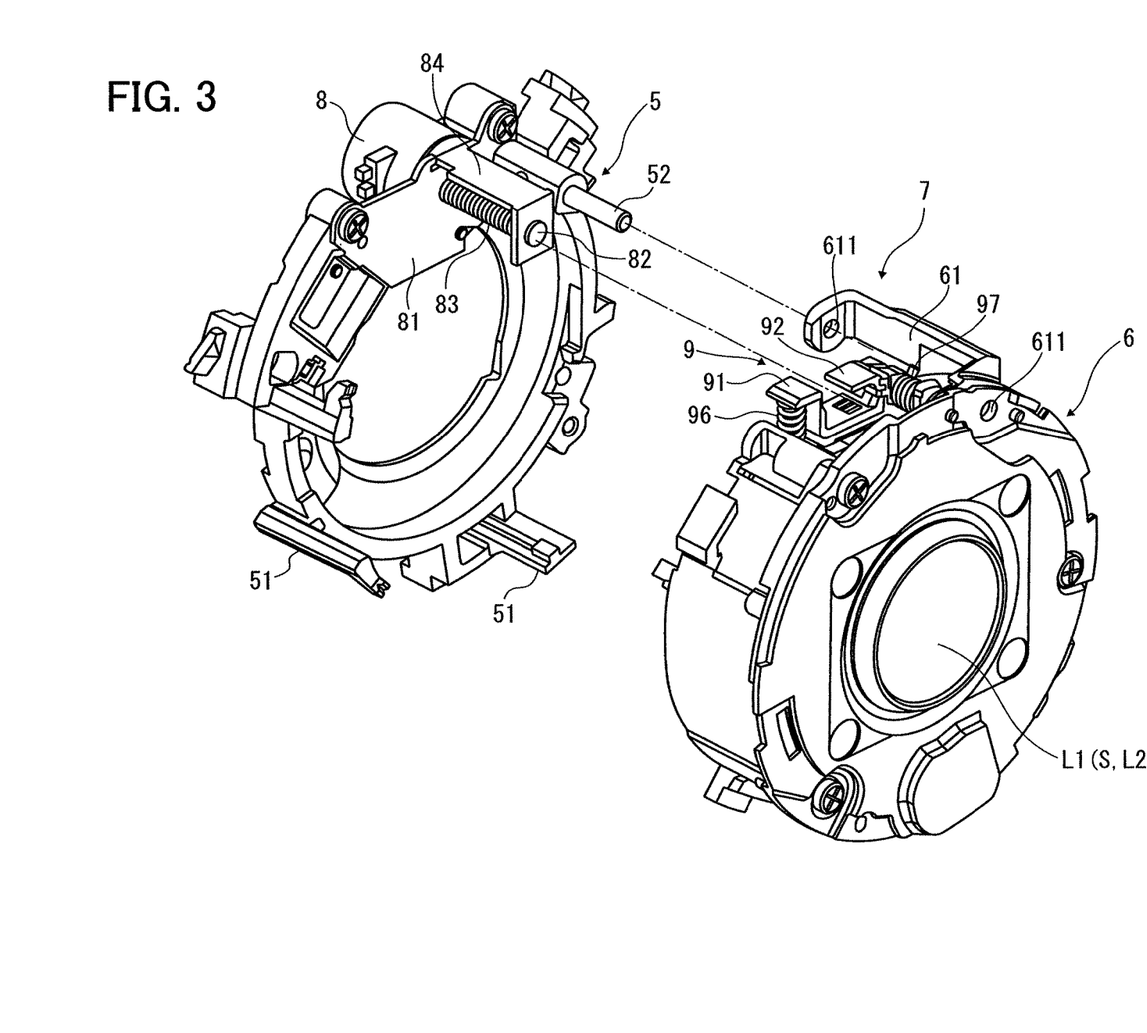
FIG. 3 is an exploded perspective view illustrating the lens cylinder according to the embodiment of the present invention.

FIG. 2 is a perspective view illustrating the lens cylinder 4 as seen from the left anterior side. FIG. 3 is a perspective view illustrating the separated motor frame 5 and the lens-holding frame 6 constituting the lens cylinder 4. The motor frame 5 includes an approximate circular shape, and a plurality of supporting pieces 51 for holding the lens-holding frame 6. The supporting pieces 51 are provided in two positions in the lower circumference surface of the motor frame 5, and the supporting pieces 51 project forward. The motor frame 5 also includes a thin cylindrical main axis 52 which is a guide for moving the lens-holing frame 6 in the lens optical axis direction. The main axis 52 is provided in a part of the upper circumferential surface, and the main axis 52 projects in the lens optical axis direction.

On the other hand, the lens-holding frame 6 is formed as a short cylindrically-shaped container. The first lens group L1, the second lens group L2, and the shutter S which are not illustrated in FIGS. 2, 3 are held in the circular opening provided in the central position of the lens-holding frame 6. The lens-holding frame 6 is disposed in front of the motor frame 5, and the lower circumferential surface of the lens-holding frame 6 is supported by the two supporting pieces 51 of the motor frame 5. A narrow bracket 61 is provided in a part of the circumference of the lens-holding frame 6, and the narrow bracket 61 extends backward. The main axis 52 of the motor frame 5 is inserted into a main axis hole 611 which opens in the bracket 61 in the lens optical axis direction, so that the lens-holding frame 6 can be relatively movable in the lens optical axis direction while maintaining the coaxial state relative to the motor frame 5. In this embodiment, the focusing in the lens unit LU is performed by the movement of the lens-holding frame 6 in the lens optical axis direction.

The lens driver 7 of the present invention includes a lead screw device which reciprocates the lens-holding frame 6 in the lens optical axis direction relative to the motor frame 5. Namely, as illustrated in FIGS. 2, 3, a driving motor 8 of a stepping motor is fastened to the motor frame 5 by a fastening plate 81. A lead screw 82 having a predetermined length in the lens optical axis direction is coaxially connected to the not-illustrated rotation output axis of the driving motor 8. A thread portion 83 having a triangular or trapezoidal shape (in this case, trapezoidal shape) in section in an axis center direction is formed in the circumferential surface of the lead screw 82. A part of the fastening plate 81 is formed to project forward into an L-shape as an axis-supporting piece 84, in order to ensure the stability of the lead screw 82 in an axis center direction during the rotation, and the leading end portion of the lead screw 82 is supported by the leading end of the axis-supporting piece 84. With this axis supporting structure, the lead screw 82 stably rotates about an axis center parallel to a lens optical axis Lx while the driving motor 8 rotates.

On the other hand, the driven body 9 which is engagable with the thread portion 83 of the lead screw 82 is integrally supported by a part of the circumference of the lens-holding frame 6 facing the lead screw 82 in the lens optical axis direction. When the lens-holding frame 6 is assembled to the motor frame 5, the driven body 9 engages with the thread portion 83 of the lead screw 82. When the lead screw 82 rotates by the spiral structure of the thread portion 83 of the lead screw 82, the driven body 9 reciprocates in a straight line in an axis direction, namely, the lens optical axis Lx direction. The lens-holding frame 6 which supports the driven body 9 moves in the lens optical axis direction together with the driven body 9 while being guided by the main axis 52 of the motor frame 5.

Figure 4:
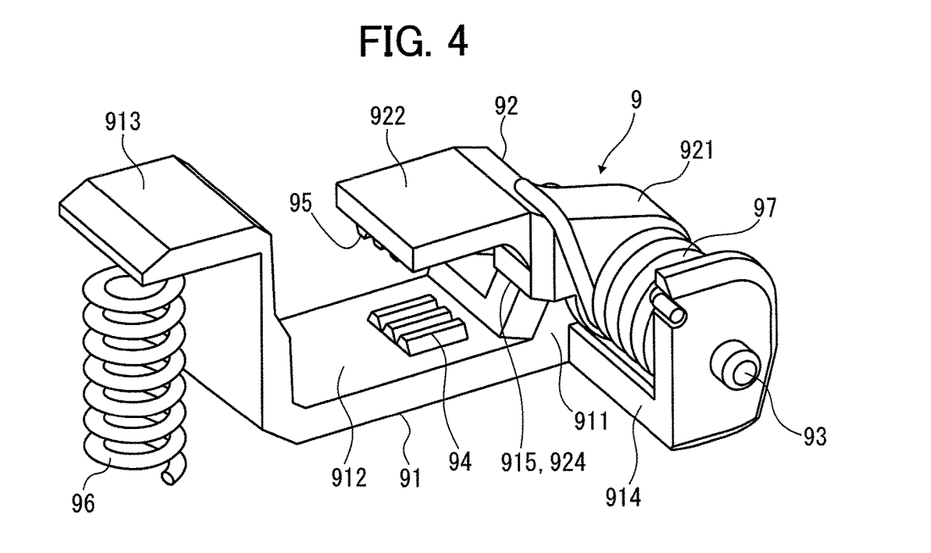
FIG. 4 is an external perspective view illustrating a driven body of a lead screw device or a lens driver according to the embodiment of the present invention.
Figure 5:
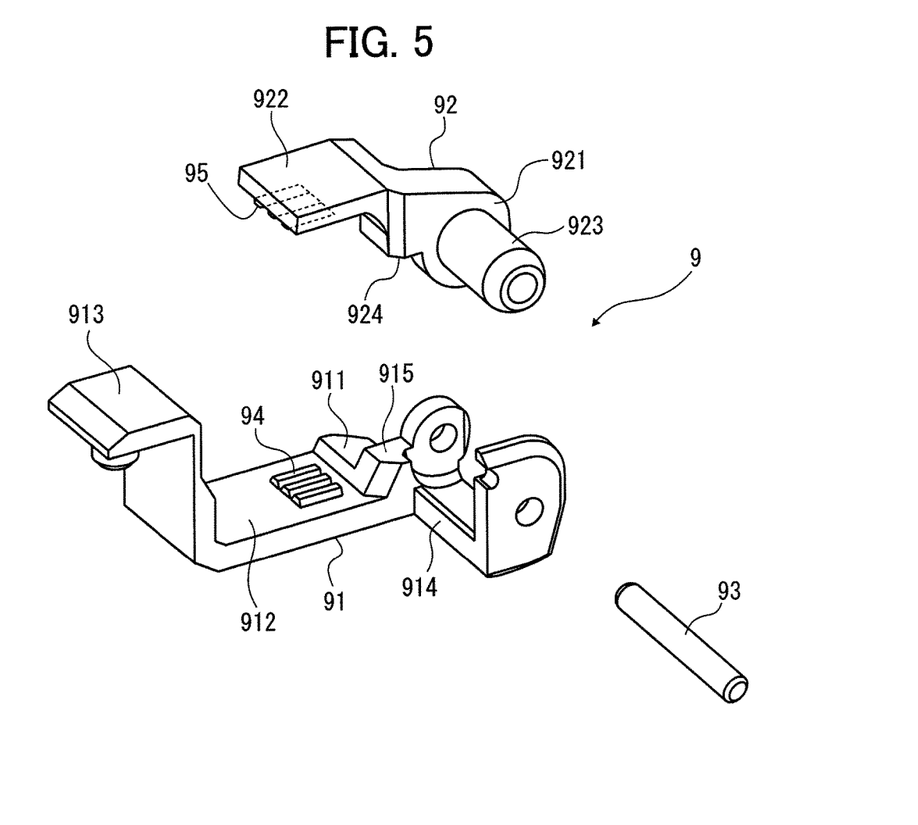
FIG. 5 is an exploded perspective view illustrating a substantial section of the driven body.

As illustrated in the external perspective view in FIG. 4 and the exploded perspective view of the substantial section in FIG. 5, the driven body 9 includes a pair of rack members 91 (first driven member), 92 (second driven member), which is supported by one rack axis 93, so as to individually rotate about the rack axis 93. The first rack member 91 located in the lower side in FIGS. 4, 5 includes a base end portion 911 through which the rack axis 93 is inserted, a middle portion 912, and a leading end portion 913. The middle portion 912 extends in an approximate straight line in the horizontal direction from the base end portion 911, and the leading end portion 913 has an inverted L-shape. A first rack tooth 94 (first tooth portion) which can engage with the thread portion 83 of the lead screw 82 is integrally formed on the upper surface of the middle portion 912. The second rack member 92 located in the upper side in FIGS. 4, 5 has a length in the horizontal direction, which is shorter than that of the first rack member 91. The second rack member 92 includes a base end portion 921 through which the rack axis 93 is inserted and a leading end portion 922 extending from the base end portion 921. A second rack tooth 95 (second tooth portion) which can engage with the thread portion 83 of the lead screw 82 is integrally formed in the lower surface of the leading end portion 922. The first rack tooth 94 and the second rack tooth 95 are disposed to face each other. Both of the first rack tooth 94 and the second rack tooth 95 engage with the thread portion 83 of the lead screw 82 while sandwiching the thread portion 83 therebetween in a radial direction. In this embodiment, each of the first rack tooth 94 and the second rack tooth 95 includes three teeth arranged in parallel, and each of the three teeth has a triangular shape or a trapezoidal shape (in this case, trapezoidal shape) in section in accordance with the shape of the thread portion 83 of the lead screw 82.

A cylindrical boss 923 is integrally formed in the base end portion 921 of the second rack member 92. The rack axis 93 is inserted through the boss 923. An approximate U-shaped axis supporter 914 having a measurement corresponding to a length of the base end portion 921 and the boss 923 of the second rack member 92 is integrally formed in the base end portion 911 of the first rack member 91. Both ends of the rack axis 93 inserted through the base end portion 921 and the boss 923 of the second rack member 92 are supported by the axis supporter 914. The first and second rack members 91, 92 thereby individually rotate about the rack axis 93. In addition, a second biasing spring 97 (second biasing member) is wound around the boss 923. The details thereof will be described later.

Figure 6A:
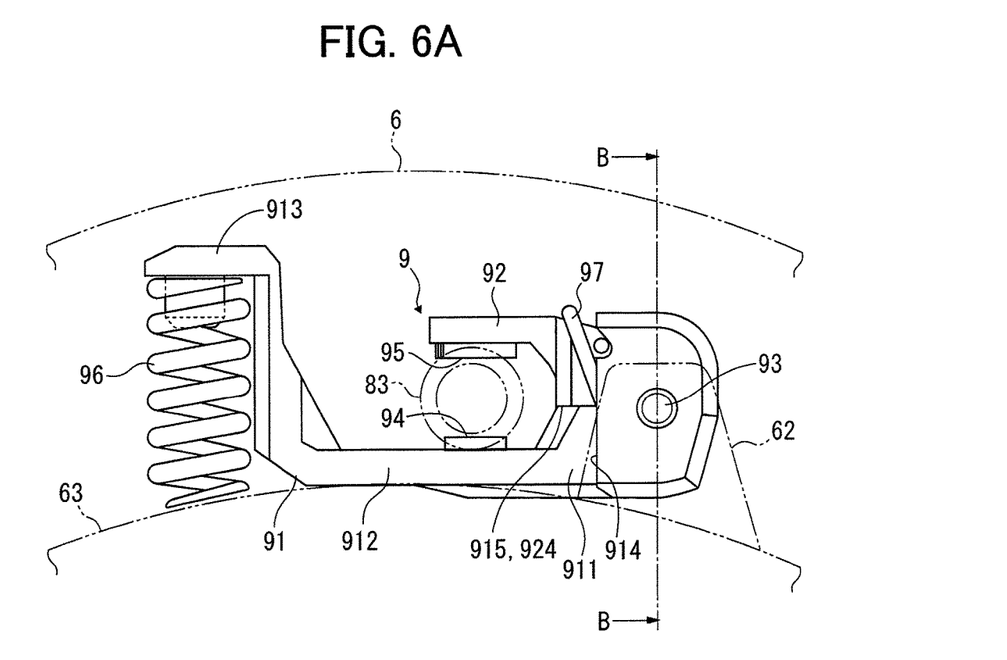
FIG. 6A is a front view illustrating the assembled driven body.
Figure 6B:
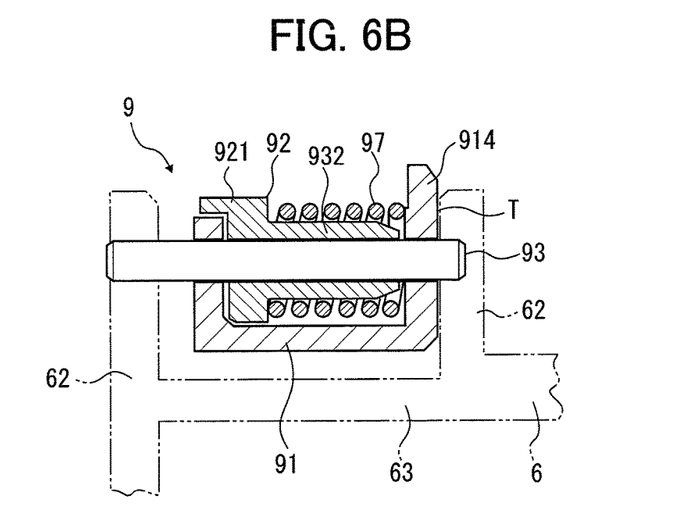
FIG. 6B is a sectional view illustrating the substantial section of the driven body.

The driven body 9 with the above-described configuration is assembled to the upper portion of the lens-holding frame 6 as illustrated in FIGS. 2, 3. FIG. 6A is a front view illustrating the assembled driven body 9. FIG. 6B is a sectional view along B-B line. Both ends of the rack axis 93 project from the axis supporter 914 of the first rack member 91. Both of the projecting ends of the rack axis 93 are supported by a pair of ribs 62 illustrated by the dashed line in FIGS. 6A, 6B. A pair of ribs 62 is provided in a part of a circumference of a circumferential surface 63 of the lens-holding frame 6, and projects in an external diameter direction, so as to face to each other in the lens optical axis direction. The first rack member 91 and the second rack member 92 thereby rotate about the rack axis 93 in a radial direction on a surface perpendicular to the lens optical axis Lx on the lens-holding frame 6.

When the first and second rack members 91, 92 are supported by the lens-holding frame 6 as described above, the lower surface of the leading end portion 913 of the first rack member 91 is disposed to face a part of the circumferential surface 63 of the lens-holding frame 6. A first biasing spring 96 (first biasing member) made of a compression coil spring is arranged between the lower surface and the circumferential surface in an approximate radial direction. The first rack member 91 rotates about the rack axis 93 in the outer diameter direction of the lens-holding frame 6 by the biasing force of the first biasing spring 96. The second biasing spring 97 made of a compression torsion spring is wound around the boss 923 of the second rack member 92. Both ends of the second biasing spring 97 are locked to the first rack member 91 and the second rack member 92, respectively, so that the second rack member 92 rotates in the direction in which the leading end portion 922 comes close to the first rack member 91, namely, in the inner diameter direction of the lens-holding frame 6. However, the first rack member 91 has contact with the second rack member 92 in a part of the facing surfaces of the base end portions 911, 921. These contact surfaces therefore operate as position-controlling surfaces 915, 925 (position controller). The rack tooth 94 of the first rack member 91 and the rack tooth 95 of the second rack member 92 are also controlled by the biasing force of the second biasing spring 97, so that they do not come close to each other over a required interval. The second biasing spring 97 is arranged between the second rack member 92 and the first rack member 91 in a state compressed in the axis direction of the rack axis 93. With this configuration, the end surface T of the axis supporter 914 of the first rack member 91 has contact with the inner surface of the rib 62 of the lens-holding frame 6 by an elastic recovery force. By the contact force in the end surface T, the first rack member 91 is integrated with the lens-holding frame 6, more specifically, the driven body 9 is integrated with the lens-holding frame 6, and the first rack member 91, namely, the driven body 9 and the lens-holding frame 6 move together in the lens optical axis direction.

Figure 7:
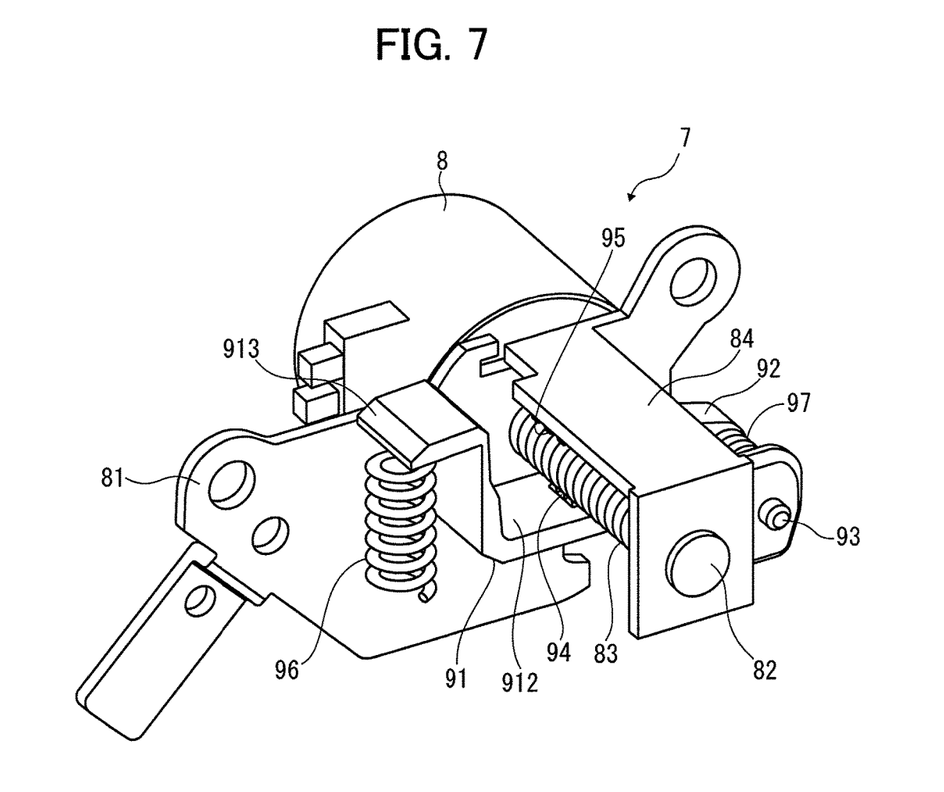
FIG. 7 is an external perspective view illustrating the substantial section of the lens driver.

The driven body 9 with the above-described configuration is assembled to the lead screw 82, so as to constitute the lens driver 7. In this case, the main axis 52 of the motor frame 5 is inserted through a main axis hole 611 of the lens-holding frame 6, so that the lens-holding frame 6 is coaxially assembled in the front surface position of the motor frame 5. In this case, the driven body 9 moves forward from the lateral side of the lead screw 82, and the lead screw 82 is sandwiched between the first rack member 91 and the second rack member 92. FIG. 7 is a perspective view illustrating a substantial section in this state. Namely, the first rack member 91 rotates in the inner diameter direction of the lens-holding frame 6 against the biasing force of the first biasing spring 96, and the second rack member 92 rotates in the outer diameter direction of the lens-holding frame 6 against the biasing force of the second biasing spring 97. With this configuration, the interval between the facing rack members 91, 92 is increased, so that the lead screw 82 can be sandwiched between the rack members 91, 92.

Figure 8A:
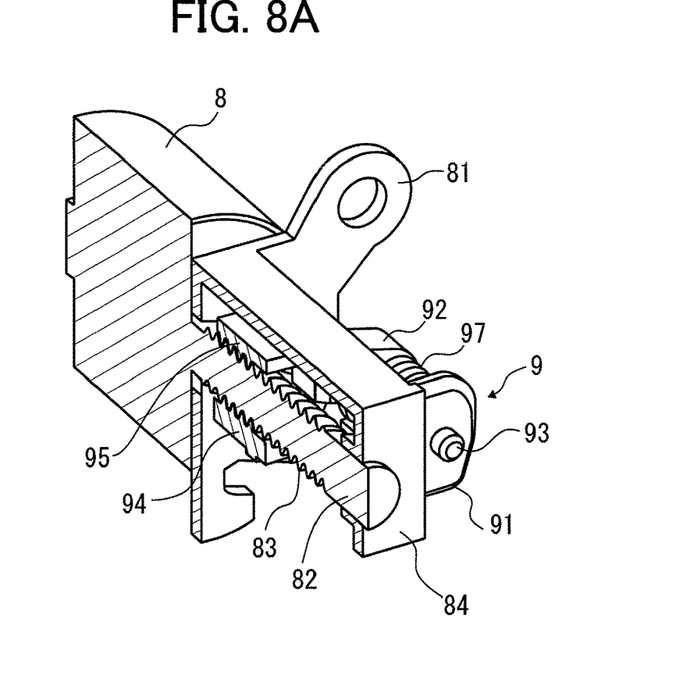
FIGS. 8A, 8B are a perspective view and a sectional view, respectively, illustrating the substantial section of the lens driver in which a part of the substantial section is cut.
Figure 8B:
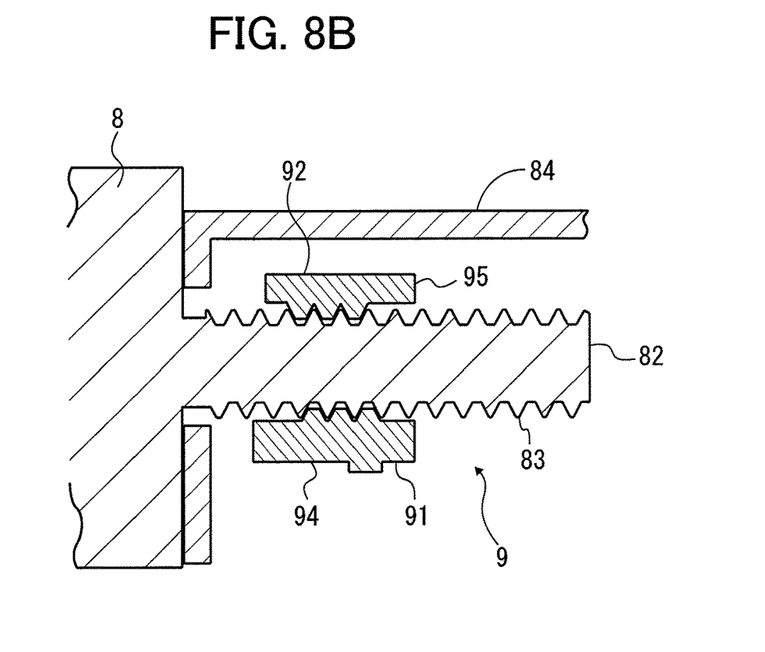

With this sandwiched state, as illustrated in the perspective view and sectional view in FIGS. 8A, 8B in which a part of the configuration is cut, the first rack tooth 94 of the first rack member 91 engages with the thread portion 83 of the lead screw 82 from the inner diameter side of the lens-holding frame 6, and the second rack tooth 95 of the second rack member 92 engages with the thread portion 83 from the outer diameter side of the lens-holding frame 6 by the biasing forces of the first and second biasing springs 96, 97. More specifically, although both ends of the lead screw 82 are supported by the bracket 84 of the motor frame 5, the first and second rack members 91, 92 of the driven body 9 supported by the lens-holding frame 6 engage with the thread portion 83 of the lead screw 82. Therefore, the assembling orders of the lens driver 7 are not limited, and such a configuration is advantageous for simplifying the manufacturing and reducing the manufacturing costs.

In a state in which the driven body 9 is assembled to the lead screw 82, the first biasing spring 96 applies the biasing force to the leading end portion 913 of the first rack member 91, and the first rack tooth 94 is arranged in the intermediate portion 912 of the first rack member 91. The engagement force when the first rack tooth 94 engages with the thread portion 83 of the lead screw 82 therefore becomes larger than the biasing force of the first biasing spring 96 by this principle, so that the stable and preferable engagement with the thread portion 83 of the lead screw 82 can be obtained. The second biasing spring 97 is wound around the rack axis 93. The second biasing spring 97 can be therefore assembled at the same time as the first rack member 91 and the second rack member 92 are assembled. The assembling operation can be thus simplified, and the entire driven body 9 can be downsized. As described above, the first rack tooth 94 engages with the thread portion 83 by a desired spring force with the first biasing spring 96, and the second rack tooth 95 engages with the thread portion 83 by a desired spring force with the second biasing spring 97.

Accordingly, in the lens driver 7 assembled as described above, the lead screw 82 rotates upon the rotation of the driving motor 8, and the first rack tooth 94 and the second rack tooth 95 engaging with the thread portion 83 of the lead screw 82 move along the thread portion 83 in the axis direction of the lead screw 82. The driven body 9 made of the first rack member 91 having the first rack tooth 94 and the second rack member 92 having the second rack tooth 95 and the lens-holding frame 6 which supports the driven body 9 move in the lens optical axis direction, so that the focusing in the lens unit LU can be performed as described above.

In this case, in the lens unit according to the present embodiment, the lens barrier illustrated in FIG. 1 opens in shooting. The lens cylinder 4 is exposed through the front opening of the straight movement barrel 3. The external force in the lens optical axis direction is applied to the lens-holding frame 6 located in the front side when a photographer's hand or the like has contact with the lens cylinder 4. The external force applied to the lens-holding frame 6 is transferred to the first and second rack teeth 94, 95 through the first and second rack members 91, 92 of the driven body 9. The stress associated with the external force is generated among the first rack tooth 94, the second rack tooth 95, and the thread portion 83 of the lead screw 82 engaging with these teeth. The first and second rack teeth 94, 95 disengage from the thread portion 83 due to the stress, so that so-called tooth skipping may occur. When the tooth skipping does not occur, the first rack tooth 94, the second rack tooth 95, or the screw section 83 may be damaged due to the stress.

In contrast, in the present embodiment, the first rack tooth 94 elastically engages with the thread portion 83 by the biasing force of the first biasing spring 96, and the second rack tooth 95 elastically engages with the thread portion 83 by the biasing force of the second biasing spring 97. Therefore, when the stress among the rack teeth 94, 95 and the thread portion 83 is increased, the stress in a radial direction is generated by the wedge effect in the tapered surfaces in which each of the rack teeth 94, 95 has contact with the thread portion 83. The first and second rack teeth 94, 95 move in the outer diameter direction of the thread portion 83 by the stress against the biasing force of each of the first and second biasing springs 96, 97. The stress is absorbed or reduced by the movement in the outer diameter direction, so that the rack teeth 94, 95 are prevented from being damaged. In this case, both of the rack teeth 94, 95 are maintained in the engagement state with the thread portion 83, so that the tooth skipping does not occur. If the stress in each of the rack teeth 94, 95 is further increased upon an increase in the external force, the facing interval between the rack teeth 94, 95 is further increased, so that the rack teeth 94, 95 disengage from the thread portion 83, and tooth skipping occurs. However, each of the rack teeth 94, 95 is reliably prevented from being damaged.

In this embodiment, in order to improve the effect of preventing the damage on such a rack tooth and the effect of controlling the tooth skipping, the driven body 9 is configured as follows. More specifically, although the second rack member 92 is biased in a direction close to the first rack member 91 by the biasing force of the second biasing spring 97 as described above, the rotation angle (hereinafter sometimes referred to as a nip angle) of the second rack member 92 relative to the first rack member 91 is controlled by the contact between the position-controlling surfaces (FIG. 6) 915, 924 provided in the facing surfaces of the first rack member 91 and the second rack member 92. Namely, both of the rack members 91, 92 have contact with each other by the position-controlling surfaces 915, 924, so that the nip angle between the first rack member 91 and the second rack member 92, i.e., the interval between the facing first rack tooth 94 and the second rack tooth 95 is controlled. An interval L1 between the facing first rack tooth 94 and the second rack tooth 95 (in this case, the interval between the leading ends of the rack teeth 94, 95) is set to be larger than an interval L2 by a predetermined allowance L0 when both of the rack teeth 94, 95 engage with the thread portion 83 in a normal state. This allowance L0 is a measurement smaller than a height H from the normal engagement position in the thread portion 83 to the screw outer diameter. In addition, L3 is a measurement of the external diameter of the thread portion 83.

The first and second biasing springs 96, 97 are designed such that the biasing force when the first rack tooth 94 engages with the thread portion 83 by the first biasing spring 96 becomes larger than the biasing force when the second rack tooth 95 engages with the thread portion 83 by the second biasing spring 97. More specifically, the biasing force of the first biasing spring 96 is set to be a biasing force which can maintain a state in which the first rack tooth 94 biases the thread portion 83 even if the gravity compresses the first biasing spring 96 according to a change in the position of the lens unit LU. Moreover, it is similar to the biasing force of the second biasing spring 97. However, the biasing force of the first biasing spring 96 and the biasing force of the second biasing spring 97 are set to be biasing forces, respectively, such that each section is not damaged due to the impact generated by the engagement between the rack teeth 94, 95 and the thread portion 83 when the first rack tooth 94 and the second rack tooth 95 sandwich therebetween the thread section 83 in a radial direction by the biasing forces of the first biasing spring 96 and the second biasing spring 97. For this reason, the biasing force of one biasing spring, in this case, the second biasing spring 97 is set to be smaller so as to avoid the generation of the above-described damage even if the biasing forces of both biasing springs 96, 97 are synergized while setting the minimum biasing forces of the first and second biasing springs 96, 97 to the above-described biasing force. As a result, in this embodiment, the biasing force of the first rack tooth 94 is set to be approximately twice the biasing force of the second rack tooth 95.

Figure 9A:
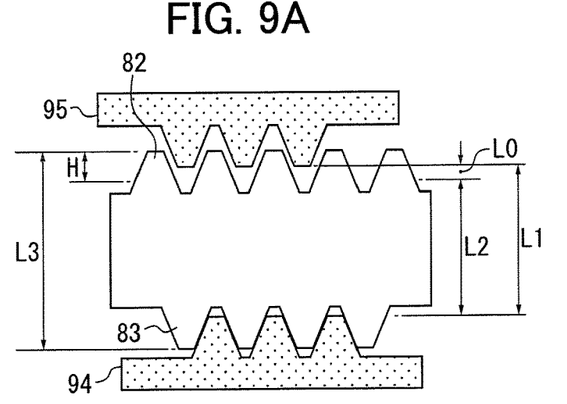
FIGS. 9A to 9C are schematic sectional views describing the engagement of a rack tooth and a thread portion.

With this design, the first rack tooth 94 engages with the thread portion 83 in a normal state by the biasing force of the first biasing spring 96, as illustrated in FIG. 9A, when the external force is not generated in the driven body 9, i.e., the first and second rack teeth 94, 95 through the lens-holding frame 6. However, the second rack tooth 95 is separated from the screw section 83 in an outer diameter direction by the allowance L0 by the control with the position control surfaces 915, 924. Accordingly, when the lead screw 82 rotates by the driving motor 8 in this state, the driven body 9 straightly moves to the lead screw 82 while maintaining the engagement between the first rack tooth 94 and the thread portion 83.

Figure 9B:
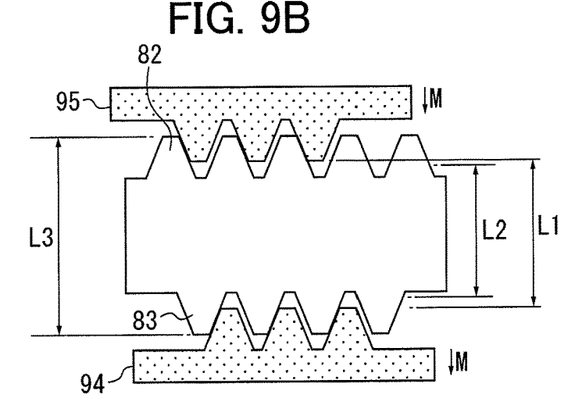

On the other hand, if the external force is applied to the driven body 9, as illustrated in FIG. 9B, the stress in the outer diameter direction is generated by the wedge effect in the contact surfaces of the first rack tooth 94 and the thread portion 83. The first rack tooth 94 moves by the stress in the outer diameter direction of the thread section 83 as the arrow M against the biasing force of the first biasing spring 96. In this case, the first rack tooth 94 does not move in the outer diameter direction with the external force smaller than the biasing force of the first biasing spring 96, so that the stable engagement state is ensured. When the stress larger than the biasing force of the first biasing spring 96 is generated based on an increase in the external force, the first rack tooth 94 moves in an outer diameter direction, but the second rack tooth 95 integrally moves in the arrow M direction following the first rack tooth 94 by the biasing force of the second biasing spring 97. Therefore, the second rack tooth 95 moves in the inner diameter direction of the thread portion 83, and has contact with the thread portion 83. The first rack tooth 94 and the second rack tooth 95 thereby engage with the thread portion 83, so that the engagement relationship among both of the rack teeth 94, 95 and the thread portion 83 is improved compared to the engagement in which the first rack tooth 94 only engages with the thread portion 83. The external force is received by the engagement among the first and second rack teeth 94, 95 and the thread portion 83, and thus, the rack teeth 94, 95 are prevented from being damaged by the external force. The tooth skipping in each rack tooth 94, 95 can be prevented because the engagement among both of the rack teeth 94, 95 and the thread portion 83 is maintained.

Figure 9C:
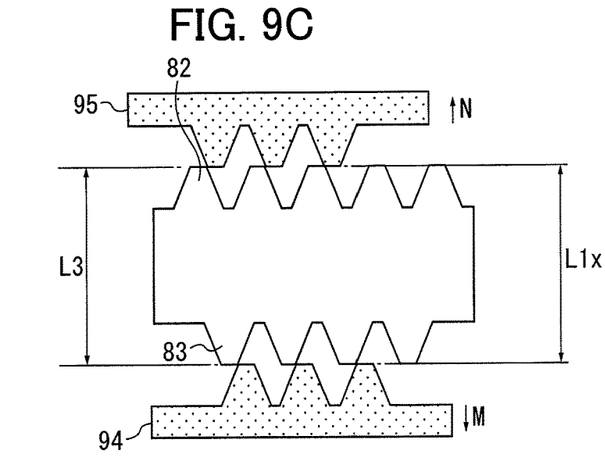

If the external force is further increased from this state, as illustrated in FIG. 9C, the stress in a radial direction in the engagement surfaces of the thread portion 83 and the first and second rack teeth 94, 95 is increased. Both of rack teeth 94, 95 move in an outer diameter direction by this stress, namely, the first rack tooth 94 moves in the arrow M direction, and the second rack tooth 95 moves in the arrow N direction, so that the interval between the facing rack teeth 94, 95 is increased to the measurement L1x. With this state, both of the rack teeth 94, 95 slightly engage with the thread portion 83. The tooth skipping does not occur if the external force is removed from this state, and the normal state illustrated in FIG. 9A is again obtained by each of the biasing forces of the first and second biasing springs 96, 95. However, if the interval L1x between the rack teeth 94, 95 becomes larger than the outer diameter L3 of the thread portion 83, as illustrated in FIG. 9C, upon a further increase in the external force, both of the rack teeth 94, 95 disengage from the thread portion 83, so that the tooth skipping is generated. Owing to the tooth skipping, an increased stress in the engagement surfaces of both of rack teeth 94, 95 and the thread portion 83 is released, and the damage on the rack teeth 94, 95 or the damage on the thread portion 83 by the stress is prevented in advance. Although the tooth skipping occurs, the lens driver 7 can be prevented from being damaged and the lens cylinder 4 or the lens unit LU can be prevented from being damaged.

When the damage on the rack teeth 94, 95 and the thread portion 83 is prevented by generating the tooth skipping if a large external force is applied as described above, the damage on the lens driver 7 can be prevented in advance. However, a problem is created in the driving control of the lens-holding frame 6, in this case, the focusing control because the positions of the rack teeth 94, 95 relative to the lead screw 82, namely, the position of the driven body 9 in the lens optical axis direction is changed, and the position of the lens-holding frame 6 in the lens optical axis direction is changed relative to the rotation angle of the driving motor 8. With respect to such a problem, a lens position detector which detects a position of the lens-holding frame 6 or the lens cylinder 4 in the lens optical axis direction, for example, a photosensor is disposed in the lens unit LU, and the focusing control is reset when the lens-holding frame 6 is detected by the lens position detector, so that the influence due to the tooth skipping can be resolved, and the subsequent focusing can be appropriately performed. In general, the lens cylinder 4 is housed on the camera body CB side in response to turning off the main switch of the camera. The position of the lens is detected by the lens position detector in the housing, so that the focusing control is reset.

Figure 10:
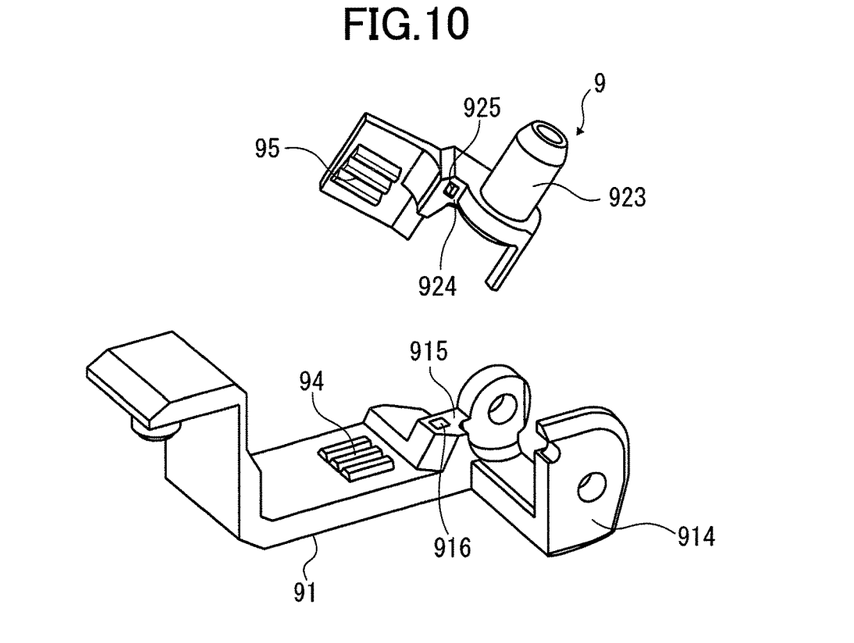
FIG. 10 is an exploded perspective view illustrating the substantial section of the driven body including a tooth-skipping detector.
Figure 11:
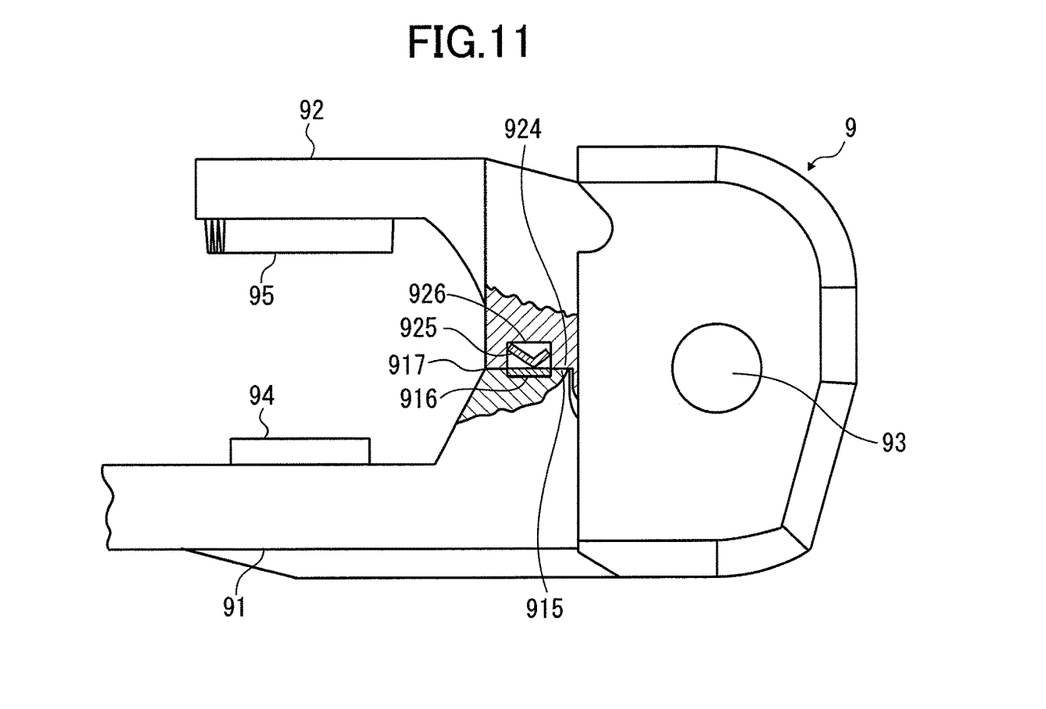
FIG. 11 is a front view illustrating the driven body including the tooth-skipping detector in which a part of the driven body is cut.

However, since the influence due to the tooth skipping remains until the position detector detects the lens-holding frame, there may be a problem in focusing in this period. Consequently, in the present embodiment, a tooth-skipping detector is disposed, and the focusing is reset just after the tooth skipping is detected. FIG. 10 is an exploded perspective view illustrating one example of the tooth-skipping detector. Contact pieces 916, 925 are disposed in the position control surfaces 915, 924 of the first and second rack members 91, 92, respectively. In this case, as illustrated in the front view of FIG. 11 in which a part of the configuration is cut, concave portions 917, 926 are formed in the position control surfaces 915, 924, respectively, and the contact pieces 916, 925 made of a conductive member are buried in the concave portions, respectively. The first contact piece 916 of the first rack member 91 is formed by a simple plate piece, and the second contact piece 925 of the second rack member 92 is curved in a thickness direction, so as to elastically deform in the thickness direction. The first contact piece 916 and the second contact piece 925 have contact with each other in a conduction state when at least one of the first rack tooth 94 and the second rack tooth 95 engages with the thread portion 83, as illustrated in FIGS. 9A, 9B.

On the other hand, when both of the first rack tooth 94 and the second rack tooth 95 do not engage with the thread portion 83, namely, the tooth skipping occurs due to the interval L1x between the first rack tooth 94 and the second rack tooth 95, which is larger than the external diameter measurement L3 of the thread portion 83, as illustrated in FIG. 9C, the position control surfaces 915, 924 are separated, and the first contact piece 916 and the second contact piece 925 are separated from each other over the elastic deformation amount of the second contact piece 925, so as to be a non-conduction state. Not-shown lead wires are connected to the first and second contact pieces 916, 925, and the lead wires are connected to a not-shown tooth-skipping detection circuit. The tooth-skipping detection circuit is configured to simply detect the connection state of both of the lead wires.

In the tooth-skipping detector, if the tooth skipping occurs in accordance with the movement of the first and second rack teeth 94, 95 in the outer diameter direction of the thread portion 83 due to a large external force applied to the lens-holding frame 6, the nip angle between the first and second rack members 91, 92 is increased, and the position-controlling surfaces 915, 924 are separated by a predetermined measurement or more, so that the first and second contact pieces 916, 925 are separated to be in a non-conduction state. The tooth-skipping detection circuit is configured to detect the occurrence of the tooth skipping by detecting the non-conduction of the contact pieces 916, 925, and immediately reset the focusing control similar to that of the lens position detector upon the detection of the tooth skipping. Focusing can be therefore appropriately performed regardless of the occurrence of the tooth skipping.

The teeth skipping detector is configured to detect possible tooth skipping of the rack teeth 94, 95 relative to the thread portion 83. With this configuration, the tooth skipping can be detected by detecting a situation in which an external force or impact applies to the lens-holding frame 6 or the driven body 9 by predetermined amount or more. For this reason, an acceleration sensor can be integrally provided in the rack member 91 or 92, for example, and the tooth skipping can be detected when the output detected by the acceleration sensor becomes a previously set predetermined output or more. When a space to dispose the acceleration sensor in the rack member cannot be ensured, the acceleration sensor can be disposed in the lens cylinder 4, namely, a part of the motor frame 5 or the lens-holding frame 6.

In this embodiment, an example is described in which the driven body 9, which moves in a straight line in the axis direction of the lead screw 82 by the engagement with the thread portion 83 of the lead screw 82, is made of the first rack member 91 having the rack tooth 94 and the second rack member 92 having the rack tooth 95. However, the driven member in the present invention is not limited thereto, and the driven member can be a pair of members which is mounted on the lead screw from a direction sandwiching the lead screw in a radial direction and engages with the thread portion of the lead screw. For example, the driven member can be first and second driven members each integrally having a circular arc nut made of a part of a circumference of a circular nut member which can be threadably mounted on the thread portion 83 of the lead screw 82.

In the present invention, the configurations of the first and second biasing springs 96, 97 are not limited to the present embodiment as long as the first biasing spring 96 biases the first rack member 91 toward the lead screw 82, and the second biasing spring 97 biases the second rack member 92 toward the first rack member 91. The first biasing spring 96 can be a torsion spring which biases the first rack member 91 in the radial direction of the lead screw 82 relative to the lens-holding frame 6. The second biasing spring 97 can be a tension coil spring which is mounted between the first and second rack members 91, 92 and biases the second rack member 92 toward the first rack member 91. In this case, the second biasing spring 97 is mounted between the second rack member 92 and the lens-holding frame 6, and biases the second rack member 92 toward the first rack member 91.

Although the embodiment of the present invention has been described above, the present invention is not limited thereto. It should be appreciated that variations may be made in the embodiment described by persons skilled in the art without departing from the scope of the present invention. The present invention is not limited to the lead screw device as the lens driver in the embodiment of the present invention as long as it has a configuration in which the driven body engaging with the thread portion of the lead screw moves in a straight line in an axis center direction upon the rotation of the lead screw about an axis. Moreover, the lens driver of the present invention is not limited to the lens driver for focusing as described in the embodiment as long as it has a configuration which moves the lens disposed in the lens barrel in a lens optical axis direction. The lens driver of the present invention can be applied as a lens driver for zooming, which changes a lens focusing distance. Furthermore, the lens barrel of the present invention is not limited to the lens unit which is integrally provided in the camera body as described in the embodiment. The lens barrel of the present invention can be applied as a lens barrel for an exchangeable lens of a lens-exchangeable camera. The camera of the present invention is not limited to a camera which images a still image as described in the embodiment. The camera of the present invention can be applied to a camera which images a moving image.

The present invention is adopted not only to a lead screw device but also to a lens driver including the lead screw device, a lens barrel, and a camera including the lens driver.

According to the embodiment of the present invention, in the lead screw device, a pair of the driven members which is disposed to sandwich the lead screw in a radial direction is biased in a direction sandwiching the lead screw, and the tooth portion provided in each driven member engages with the thread portion of the lead screw by the biasing force. Each of the driven members therefore stably engages with the thread portion by the biasing force. A pair of driven members moves in the external diameter direction of the lead screw against the biasing forces when an external force is applied to the driven body, so that the driven members can be prevented from being damaged. In particular, a pair of the driven members includes the first driven member and the second driven member which are connected to be rotatable about an axis. The first driven member is biased in a direction rotating toward the lead screw by the first biasing member, and the second driven member is biased in a direction rotating toward the first driven member by the second biasing member. With this configuration, the first driven member appropriately engages with the thread portion by adjusting the biasing force of the first biasing member. The second driven member which is controlled in a predetermined angle position relative to the first driven member is maintained in an engagement state having a predetermined positional relationship relative to the thread portion by adjusting the biasing force of the second biasing member. On the other hand, when an external force is applied, the second driven member disengages from the thread portion, so that the tooth skipping easily occurs.

According to the embodiment of the present invention, in the lead screw device, the first and second driven members include the position controller which controls the second driven member such that the tooth portion of the second driven member is located inside the external diameter of the thread portion of the lead screw without engaging with the thread portion of the lead screw when the tooth portion of the first driven member engages with the thread portion of the lead screw. With this configuration, when an external force is applied to the driven body, the engagement state by the first driven member is ensured, and when the external force is further increased, the first and second driven members engage with the thread portion. The operation of the lead screw device is therefore ensured, and damage on each driven member and the tooth skipping are prevented. Furthermore, when the external force is unusually increased, the tooth portion of each driven member disengages from the thread portion against the biasing force of the first and second biasing members, and rotates to the external diameter position. Thus, damage on each driven member can be prevented by generating the tooth skipping.

According to the embodiment of the present invention, the lens driver includes the lead screw device. The lead screw is attached to the motor frame provided with the driving motor, and is rotatable about an axis by the driving motor. The driven body is attached to the lens-holding frame holding a lens, and moves the lens-holding frame in the lens optical axis direction along the rotation of the lead screw about an axis. With this configuration, even if an external force generated when a photographer's hand has contact with the lens-holding frame is applied, damage on the lens driver is prevented while accurately moving the lens-holding frame.

According to the embodiment of the present invention, the lens driver includes the lens position detector which detects the movement of the lens in the lens optical axis direction. The lens position detector controls the lens position controller to an initial position when the lens position detector detects the lens position. With this configuration, the lens position can be accurately controlled when the tooth skipping occurs in the lens driver. In particular, the lens driver includes the tooth-skipping detector which detects the disengagement of the driven body from the thread portion of the lead screw. The lens position controller is controlled to the initial position when the tooth-skipping detector detects the lens position. With this configuration, the lens position can be accurately controlled by immediately performing initial setting when the tooth skipping occurs.

According to the embodiment of the present invention, in the lens barrel and the camera including the lens barrel, highly accurate focusing, zooming, or the like can be performed by the accurate lens position control which is obtained in the above-described lens driver.

What is claimed is:

1. An optical device comprising:
    an optical system including a plurality of lens groups, at least one lens group of the plurality of lens groups being a movable lens group capable of moving in an optical axis direction of the optical system; and
    a movable frame configured to move the movable lens group,
    the movable frame including:
        a driving source;
        a drive screw driven by the driving source;
        a lens supporting frame configured to support the movable lens group and maintaining an integrated state relative to the movable lens group;
        a plurality of arms separate from the lens supporting frame and disposed in a position to face the drive screw and being openable and closable relative to the drive screw with a single opening and closing axis as a support axis, the plurality of arms including a first arm and a second arm; and
        a first biasing spring configured to apply a first biasing force to the first arm in a direction in which the first arm approaches the drive screw.

2. The optical device according to claim 1, wherein the direction in which the first arm approaches the drive screw is a rotational direction.

3. The optical device according to claim 1, wherein the optical axis of the optical system is different from the support axis.

4. The optical device according to claim 1, wherein the first biasing spring is configured to directly apply a first biasing force to move only the first arm in the direction in which the first arm approaches the drive screw, without applying a biasing force to the second arm.

5. The optical device according to claim 1, wherein the first biasing spring is sandwiched between the lens supporting frame and the first arm.

6. The optical device according to claim 1, wherein the first biasing spring is positioned on an opposite side of the drive screw from the support axis.

7. The optical device according to claim 1, wherein:
    the lens supporting frame is further configured to support the plurality of arms; and
    a lower surface of a leading end of the first arm faces a circumferential surface of the lens supporting frame.

8. The optical device according to claim 1, wherein the first biasing spring has one end biased against the lens supporting frame, and has another end biased against the first arm.

9. The optical device according to claim 1, wherein the first arm and the second arm are each movable relative to the lens supporting frame.

10. The optical device according to claim 1, wherein the lens supporting frame is further configured to support the first biasing spring.

11. The optical device according to claim 1, further comprising a second biasing spring configured to apply a second biasing force in a direction in which the second arm approaches the drive screw, wherein the first arm is a support structure for directly supporting the second biasing spring.

12. The optical device according to claim 11, wherein the direction in which the second arm approaches the drive screw is a rotational direction.

13. The optical device according to claim 11, wherein the first biasing spring and second biasing spring extend in directions different from each other.

14. The optical device according to claim 1, wherein:
    each of the first arm and the second arm include teeth; and
    the teeth of the first arm and the second arm disengage from the drive screw when a predetermined external force is applied.

15. The optical device according to claim 14, further comprising a second biasing spring configured to apply a second biasing force in a direction in which the second arm approaches the drive screw, wherein:
    the first arm is a support structure for directly supporting the second biasing spring, the first arm and the second arm are rotatable to a position in a radial direction of the drive screw, and
    the teeth of each of the first and second arms disengage from a thread of the drive screw against the first and second biasing forces when the predetermined external force is applied.

16. The optical device according to claim 1,
    wherein each of the first arm and the second arm include teeth; and
    wherein the first and second arms include a position controller configured to:
    control a rotation position in a direction which sandwiches the drive screw in a radial direction of the drive screw, and
    control the second arm such that the teeth of the second arm are located inside an external diameter of a thread of the drive screw without engaging with the thread of the drive screw when the teeth of the first arm engage with the thread of the drive screw.

17. The optical device according to claim 16, wherein the first biasing spring is configured to apply a biasing force which engages the teeth of the first arm with the thread of the drive screw.

18. The optical device according to claim 1, wherein the first biasing spring is positioned between a lower surface of a leading end of the first arm and a circumferential surface of the lens supporting frame.

19. The optical device according to claim 18, wherein the first biasing spring is coiled about an axis in an approximate radial direction to the optical axis direction.

* * * * *